(12) United States Patent
Christy et al.

(10) Patent No.: US 12,529,819 B2
(45) Date of Patent: Jan. 20, 2026

(54) DIRECT PUSH PROBE ASSEMBLY FOR NMR MEASUREMENTS

(71) Applicant: Kejr, Inc., Salina, KS (US)

(72) Inventors: Thomas M Christy, Salina, KS (US); Blake G Slater, Salina, KS (US); David O Walsh, Mukilteo, WA (US)

(73) Assignees: Kejr Inc., Salina, KS (US); Vista Clara Inc., Mukilteo, WA (US)

( * ) Notice: Subject to any disclaimer, the term of this patent is extended or adjusted under 35 U.S.C. 154(b) by 141 days.

(21) Appl. No.: 18/511,945

(22) Filed: Nov. 16, 2023

(65) Prior Publication Data

US 2024/0159935 A1    May 16, 2024

Related U.S. Application Data

(60) Provisional application No. 63/425,955, filed on Nov. 16, 2022.

(51) Int. Cl.
*G01V 3/32* (2006.01)
*G01N 24/08* (2006.01)

(52) U.S. Cl.
CPC ............. *G01V 3/32* (2013.01); *G01N 24/085* (2013.01)

(58) Field of Classification Search
CPC ............................... G01V 3/32; G01N 24/085
See application file for complete search history.

(56) References Cited

U.S. PATENT DOCUMENTS

| | | |
|---|---|---|
| 4,350,955 A | 9/1982 | Jackson et al. |
| 4,710,713 A | 12/1987 | Strikman |
| 5,055,787 A | 10/1991 | Kleinberg et al. |
| 6,348,792 B1 | 2/2002 | Beard et al. |
| 7,466,128 B2 | 12/2008 | Walsh |
| 8,451,004 B2 | 5/2013 | Walsh |
| 8,581,587 B2 | 11/2013 | Walsh et al. |
| 8,736,264 B2 | 5/2014 | Walsh et al. |
| 8,816,684 B2 | 8/2014 | Walsh |
| 9,086,213 B2 * | 7/2015 | Harbers ................ F21K 9/233 |

(Continued)

OTHER PUBLICATIONS

Javelin Magnetic Resonance Wireline Logging Tools, High-Resolution In-Situ Characterization of Hydrogeologic Properties, Vista Clara Inc., Aug. 1, 2023.

*Primary Examiner* — Gregory H Curran
(74) *Attorney, Agent, or Firm* — Jeffrey L. Thompson; Thompson Law, P.A

(57) ABSTRACT

A direct push probe assembly that contains NMR components for collecting NMR measurements from soil as the probe assembly is pushed into the soil or retracted from the soil. The probe assembly includes an upper metal housing, a lower metal end piece, and a window section positioned between the upper metal housing and the lower metal end piece. The window section is made of non-conductive, non-magnetic materials for allowing NMR measurements from NMR components located within the probe assembly. The window section is cylindrical with multiple layers, including a layer of hard material capable of transmitting high compressive forces, such as a ceramic material, and a layer of reinforced composite plastic material capable of transmitting high tensile forces. The window section is secured to the upper and lower metal sections of the probe assembly using an adhesive to withstand static and dynamic driving forces transmitted through the probe during use.

28 Claims, 17 Drawing Sheets

(56) References Cited

U.S. PATENT DOCUMENTS

| | | |
|---|---|---|
| 9,348,054 B2 | 5/2016 | Walsh et al. |
| 9,429,673 B2 | 8/2016 | Walsh et al. |
| 9,551,807 B2 | 1/2017 | Walsh et al. |
| 9,588,068 B2 | 3/2017 | Grunewald et al. |
| 9,599,688 B2 | 3/2017 | Grunewald et al. |
| 10,113,982 B2 | 10/2018 | Walsh et al. |
| 10,145,915 B2 | 12/2018 | Walsh et al. |
| 10,162,026 B2 | 12/2018 | Walsh |
| 10,302,733 B2 | 5/2019 | Walsh |
| 10,585,204 B2 | 3/2020 | Grunewald et al. |
| 10,739,264 B1 | 8/2020 | Jaster et al. |
| 2006/0158652 A1* | 7/2006 | Rooney ............... G01N 21/251 356/406 |
| 2009/0107725 A1 | 4/2009 | Christy et al. |
| 2017/0064220 A1* | 3/2017 | Boss ..................... H04N 23/11 |

\* cited by examiner

DIRECT PUSH PROBE ASSEMBLY FOR NMR MEASUREMENTS

RELATED APPLICATIONS

This application claims the benefit of U.S. Provisional Patent Application No. 63/425,955 filed on Nov. 16, 2022, the contents of which are incorporated herein by reference.

STATEMENT OF GOVERNMENT SUPPORT

This invention was made in part with Government support under Agreement DE-SC0017096 awarded by the U.S. Department of Energy. The Government has certain rights in this invention.

BACKGROUND OF THE INVENTION

Field of the Invention

The present invention relates generally to devices for collecting nuclear magnetic resonance (NMR) measurements in soil, and in particular, to a direct push probe assembly that contains NMR electronics for collecting NMR measurements as the probe assembly is pushed into the soil or retracted from the soil.

Description of the Related Art

Direct push probe techniques are used to advance tooling into the ground without removing subsurface material from the hole. Direct push systems can be static or dynamic. Static direct push systems use only the static weight of the drill rig to advance the tooling into the ground, while dynamic direct push systems use a combination of the static weight of the drill rig and percussive forces (e.g., from a hydraulic hammer assembly) to advance the tooling into the ground. Direct push probes displace the excess material into the surrounding formation as the probe is driven into the ground.

NMR technology has been used in the prior art to characterize water storage and pore structure characteristics of earth formations, including measurements of volumetric water content, pore size distribution, bound and mobile aquifer porosity, hydraulic conductivity and transmissivity. NMR logging tools are available commercially from Vista Clara Inc. in Mukilteo, Washington, including, for example, the Javelin Borehole Logging Tools and Dart Portable NMR Logging Tools.

Examples of prior art magnet and coil designs for NMR systems are disclosed in U.S. Pat. No. 4,350,955 issued to Jackson et al., U.S. Pat. No. 4,710,713 issued to Strikman, U.S. Pat. No. 5,055,787 issued to Kleinberg et al., and U.S. Pat. No. 6,348,792 issued to Beard et al.

A cone penetration test (CPT) is commonly used to determine the subsurface stratigraphy in situ and to estimate geotechnical parameters of the materials present. The CPT test method involves pushing an instrumented cone at the lower tip of a probe into the ground at a controlled push rate and collecting measurements from sensitive electronics inside the cone. Common measurements collected with a CPT test cone include cone tip pressure, sleeve friction, pore pressure and tilt angle. CPT test cones are available commercially from Geoprobe Systems in Salina, Kansas, and are known in the industry as Geoprobe's NOVA CPT test cones.

There is a need for a direct push probe that can collect NMR measurements as the probe is pushed into soil or retracted from soil without first creating a borehole in the ground.

DESCRIPTION OF THE INVENTION

Figure 1:
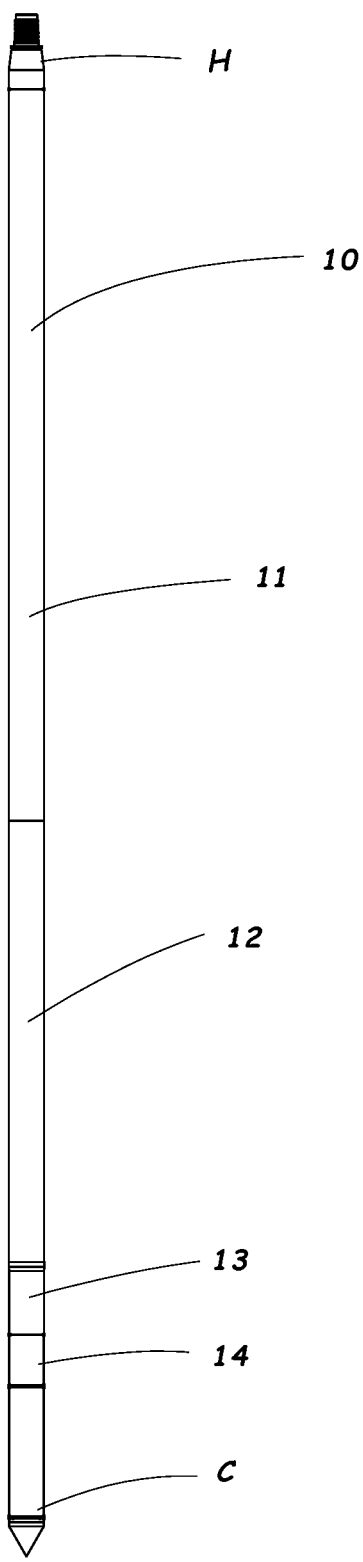
FIG. 1 is an elevation view of a direct push probe assembly having a non-conductive, non-magnetic window section according to the present invention, with a CPT cone at the lower end of the probe assembly.

A direct push probe assembly according to embodiments of the present invention will be described with reference to FIGS. 1 to 18 of the accompanying drawings.

The present invention provides a direct push probe assembly 10 containing NMR electronic components that can be pushed into soil using static force. The NMR components in the probe assembly 10 will allow NMR measurements to be made as the probe assembly 10 is pushed into the soil or retracted from the soil. A window section 12 of the direct push probe assembly 10 containing a magnet and coil component of the NMR electronics is constructed of non-conductive, non-magnetic materials. This non-conductive, non-magnetic window section 12 allows the magnetic field of the NMR electronics to penetrate into the soil surrounding the probe assembly 10.

The term "window section" as used in this application refers to the portion of the direct push probe assembly that allows electromagnetic fields to pass through the probe assembly 10 between electromagnetic measuring components located within the probe assembly 10 and the surrounding soil. The window section 12 allows electromagnetic measurements to be collected by the electromagnetic components within the probe assembly 10, including NMR measurements, capacitance measurements, and/or apparent resistivity measurements.

The direct push probe assembly 10 according to a first embodiment of the present invention is illustrated in FIGS. 1 and 3 to 11. The direct push probe assembly 10 can be pushed into soil using static force, or a combination of static and dynamic forces. The direct push probe assembly 10 includes an upper metal housing 11, a lower window section 12 made of non-conductive, non-magnetic materials, a lower end piece 13, and a cone adapter 14.

The lower end piece 13 and cone adapter 14 are both made of metal. The cone adapter 14 has a lower threaded end for attachment of either an instrumented CPT cone C or a push point. The CPT cone C or push point may have a slightly larger diameter than the window section 12 to facilitate deployment of the probe assembly 10 into the soil.

Figure 2:
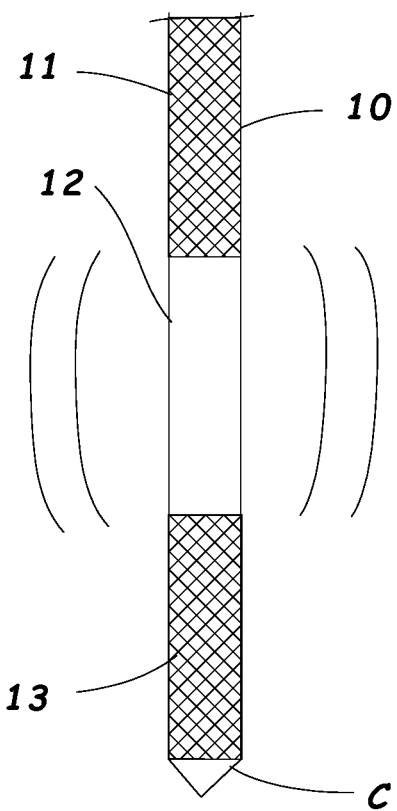
FIG. 2 is an illustration of a direct push probe assembly having a cylindrical non-conductive window section between an upper cylindrical conductive section and a lower cylindrical conductive section, with NMR sensitive zones surrounding the cylindrical window section.

As illustrated in FIG. 2, the window section 12 of the direct push probe assembly 10 of the present invention is a non-conductive, non-magnetic cylindrical section of the probe assembly 10. The cylindrical window section 12 allows electromagnetic (e.g., NMR) measurements to be collected in all azimuthal directions around a sensor positioned in the center of the probe assembly 10. The sensor has a magnet and coil configuration that uses centered measurements through the window section 12 to create sensitive zone geometries extending 360 degrees around the probe assembly 10.

Figure 3:
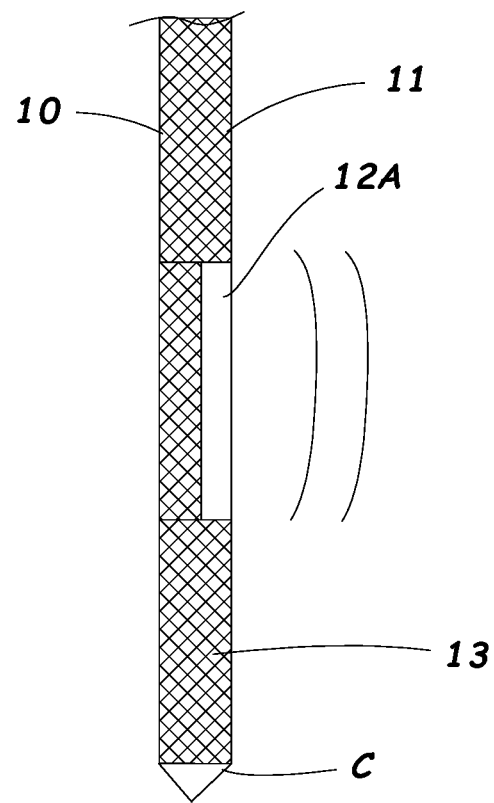
FIG. 3 is an illustration of a direct push probe assembly having a non-circumferential non-conductive window section with NMR sensitive zones in only a portion of the azimuthal directions around the tool.
Figure 4:
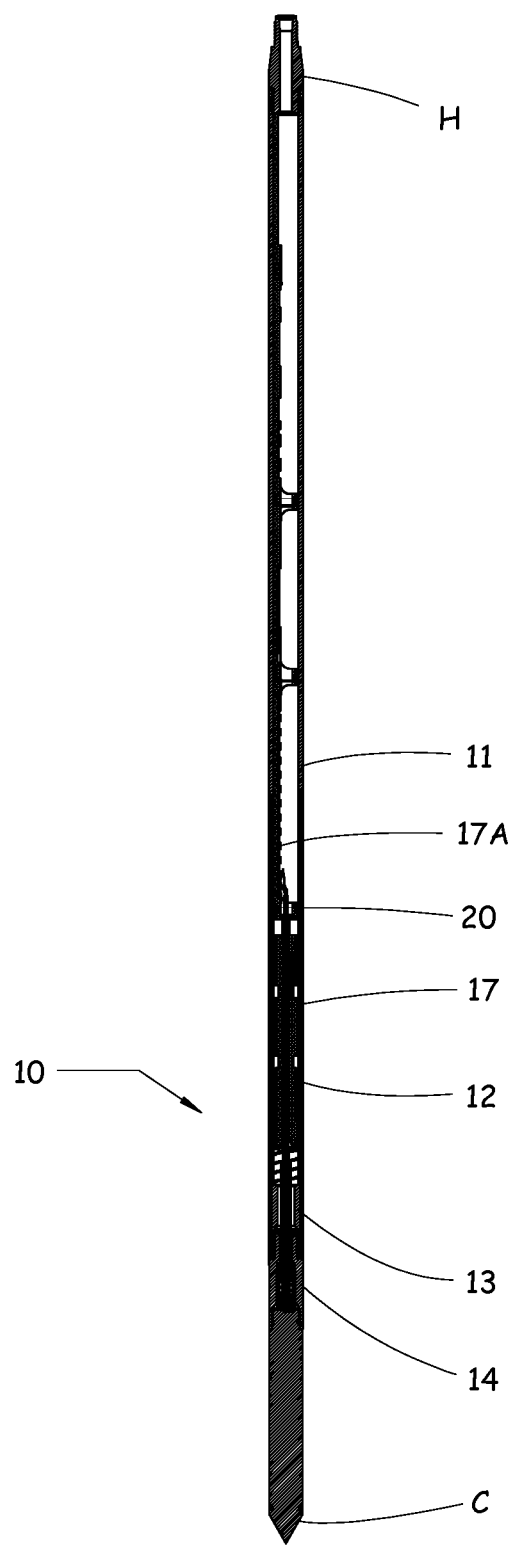
FIG. 4 is an elevation view, in cross section, of the direct push probe assembly shown in FIG. 1, with NMR components shown inside the probe assembly for collecting NMR measurements and a CPT cone at the lower end of the probe assembly.
Figure 5:
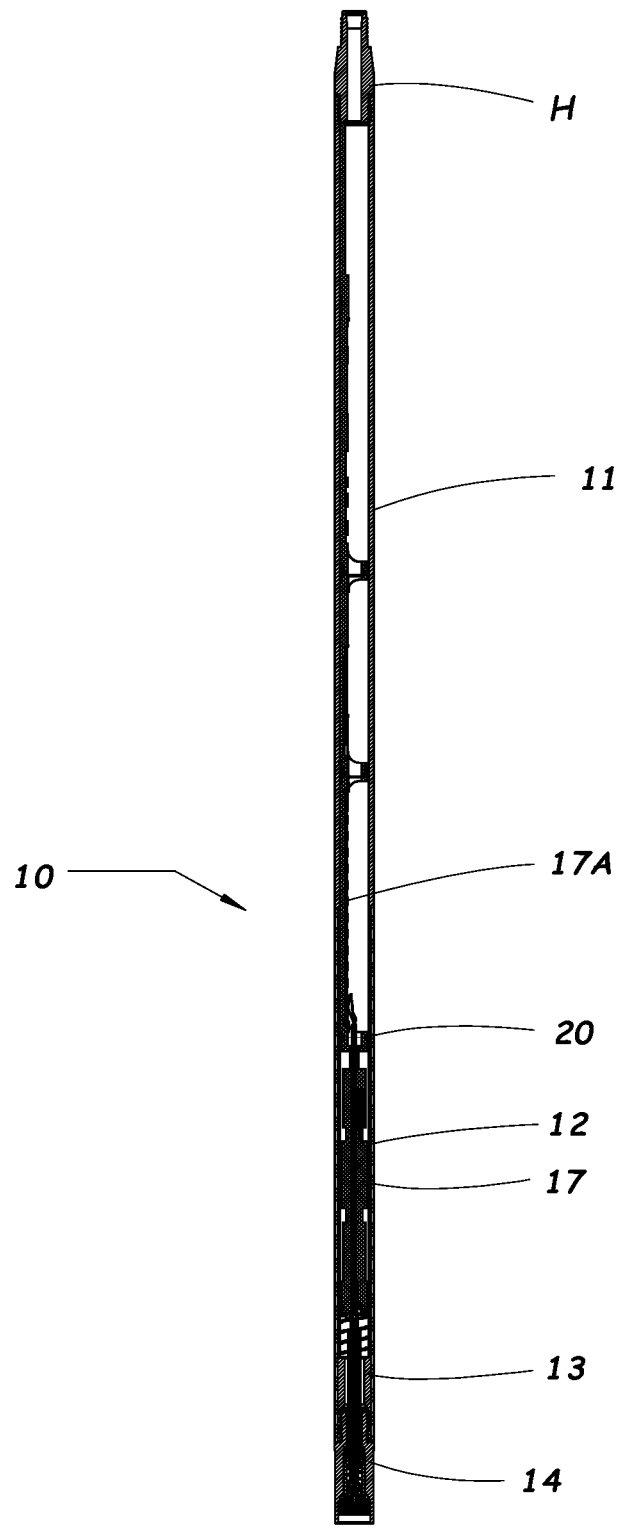
FIG. 5 is an elevation view, in cross section, of the direct push probe assembly shown in FIG. 4, with the CPT cone removed from the lower end of the probe assembly.
Figure 6:
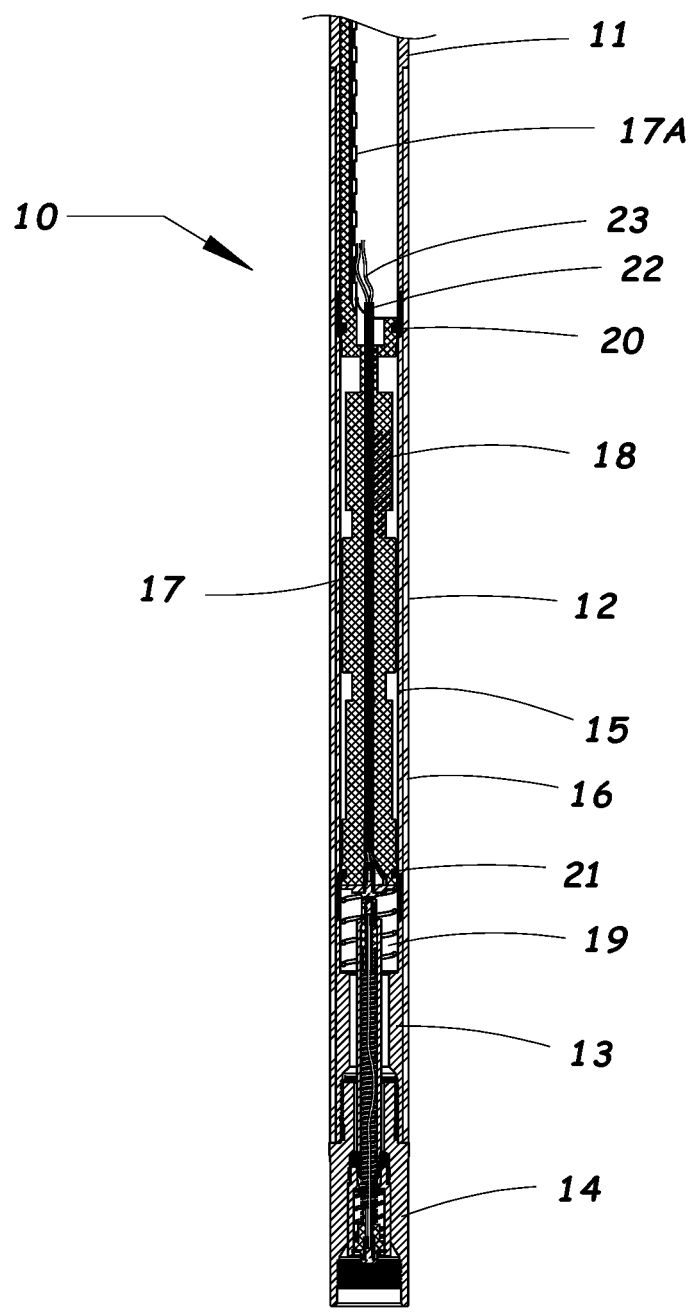
FIG. 6 is an enlarged elevation view, in cross section, of the lower portion of the direct push probe assembly shown in FIG. 5.
Figure 7:
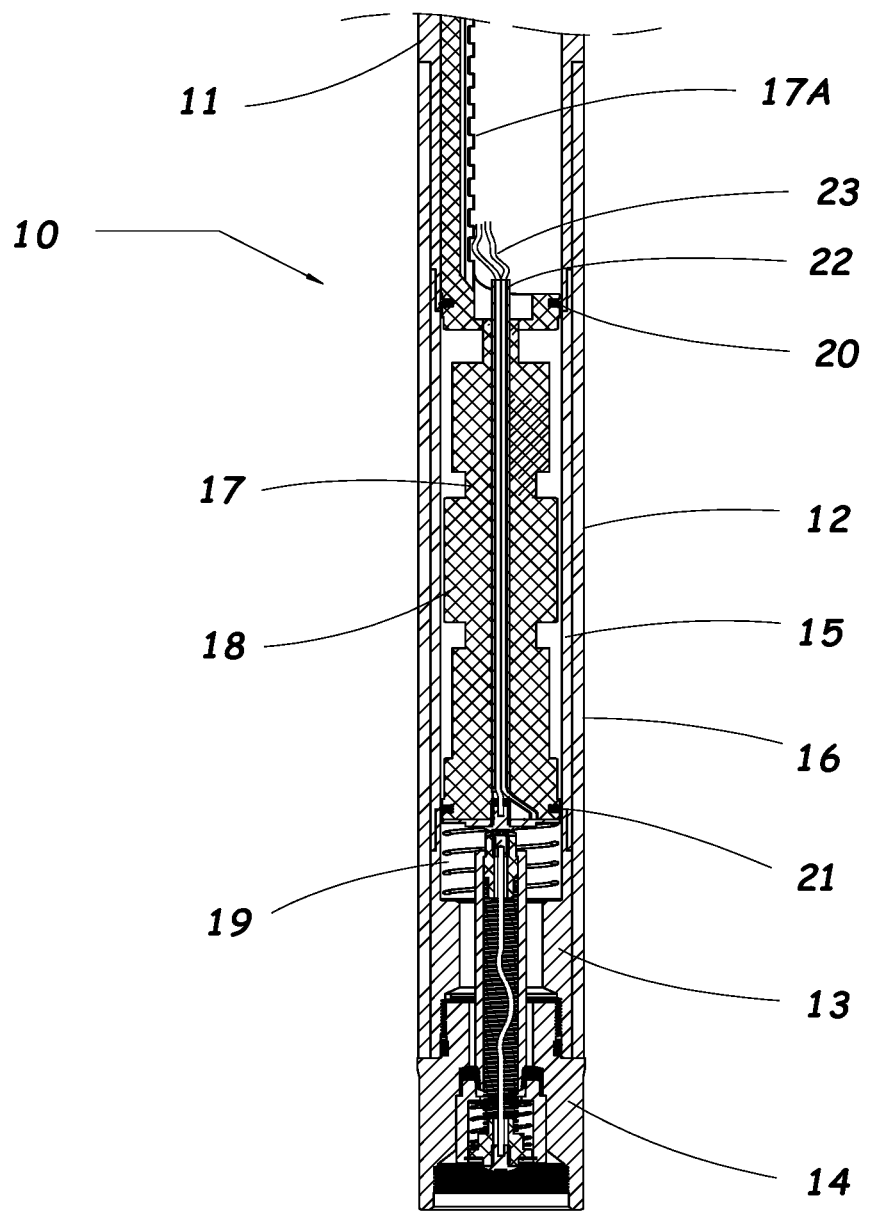
FIG. 7 is a further enlarged elevation view, in cross section, of the lower portion of the direct push probe assembly shown in FIG. 5.
Figure 8:
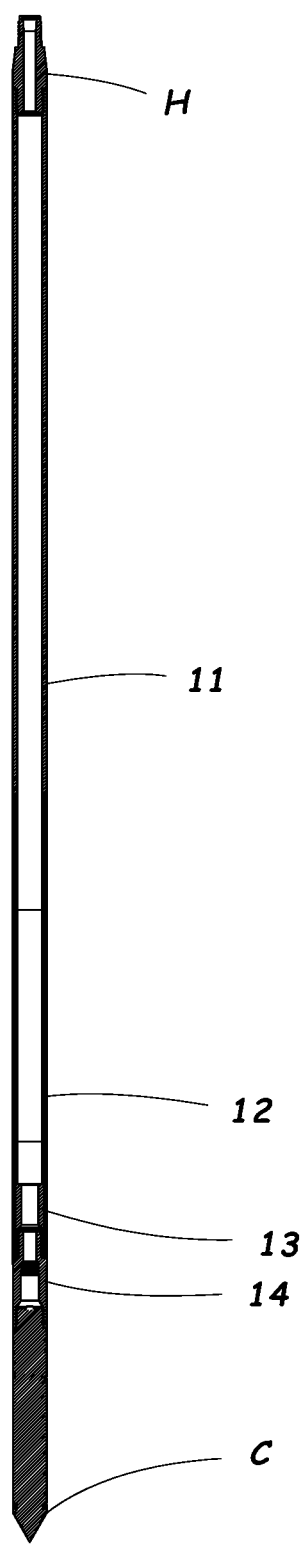
FIG. 8 is an elevation view, in cross section, of the direct push probe assembly shown in FIG. 1, with the NMR components removed and the CPT cone at the lower end of the probe assembly.
Figure 9:
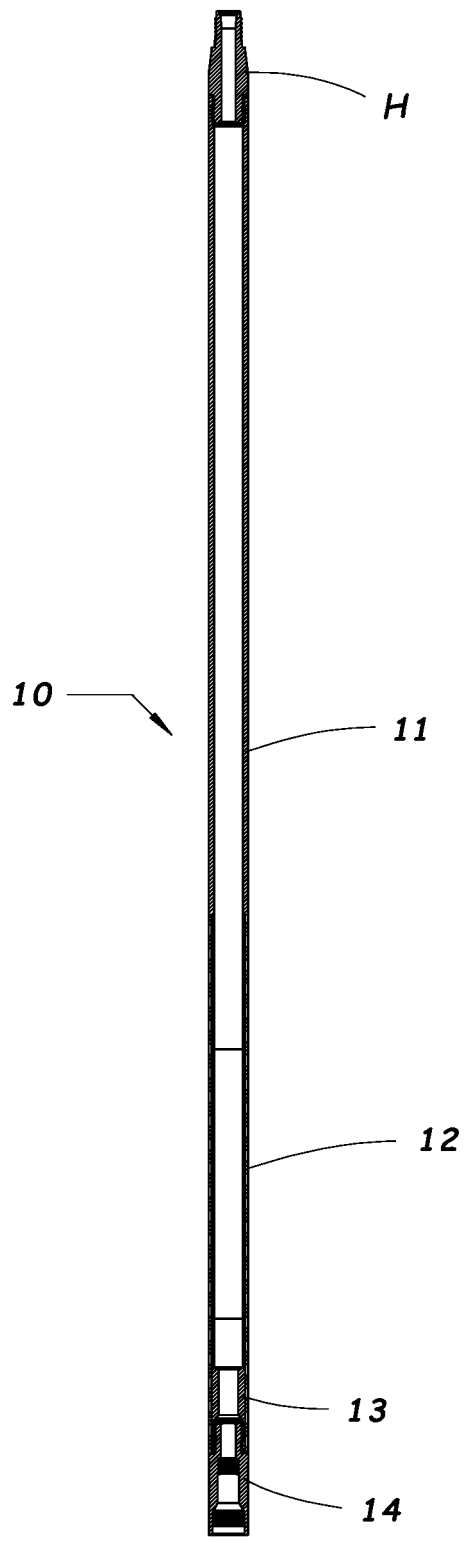
FIG. 9 is an elevation view, in cross section, of the direct push probe assembly shown in FIG. 8, with the CPT cone removed from the lower end of the probe assembly.
Figure 10:
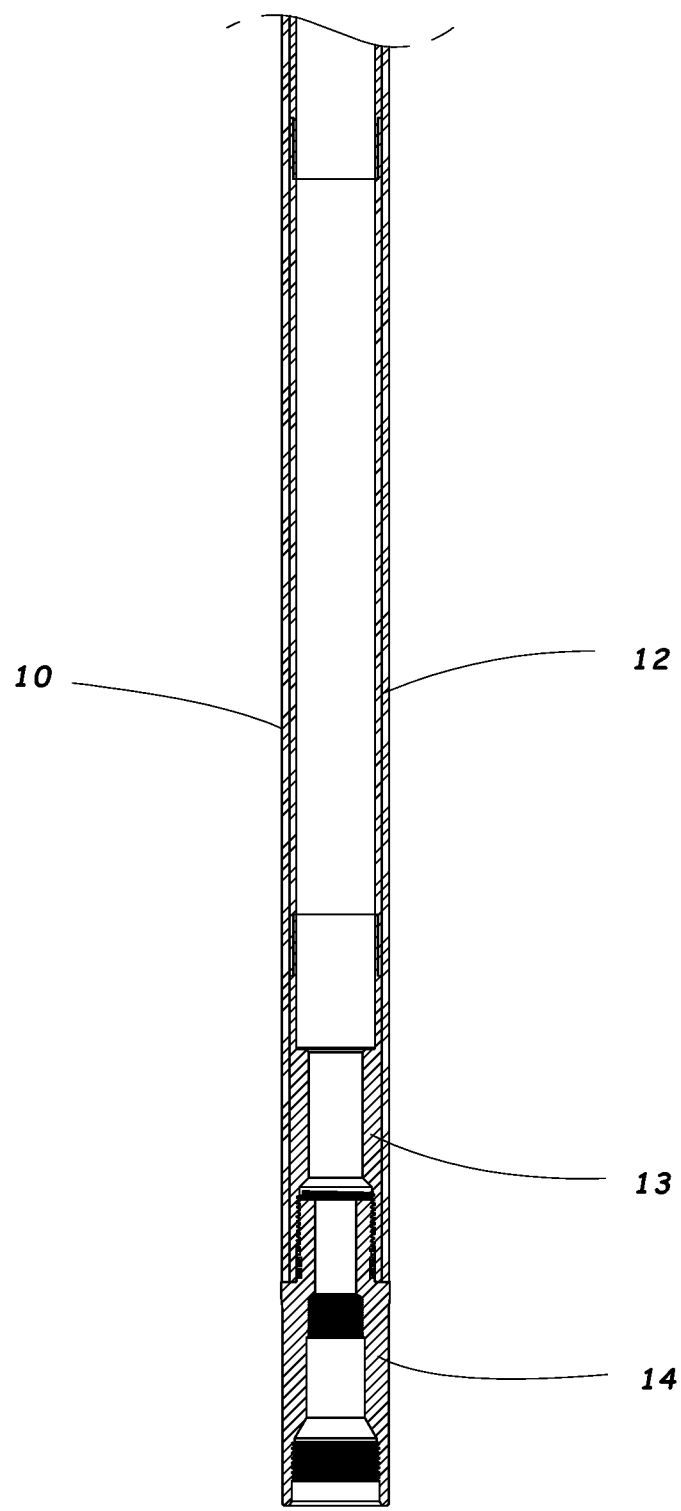
FIG. 10 is an enlarged elevation view, in cross section, of the lower portion of the direct push probe assembly shown in FIG. 8.
Figure 11:
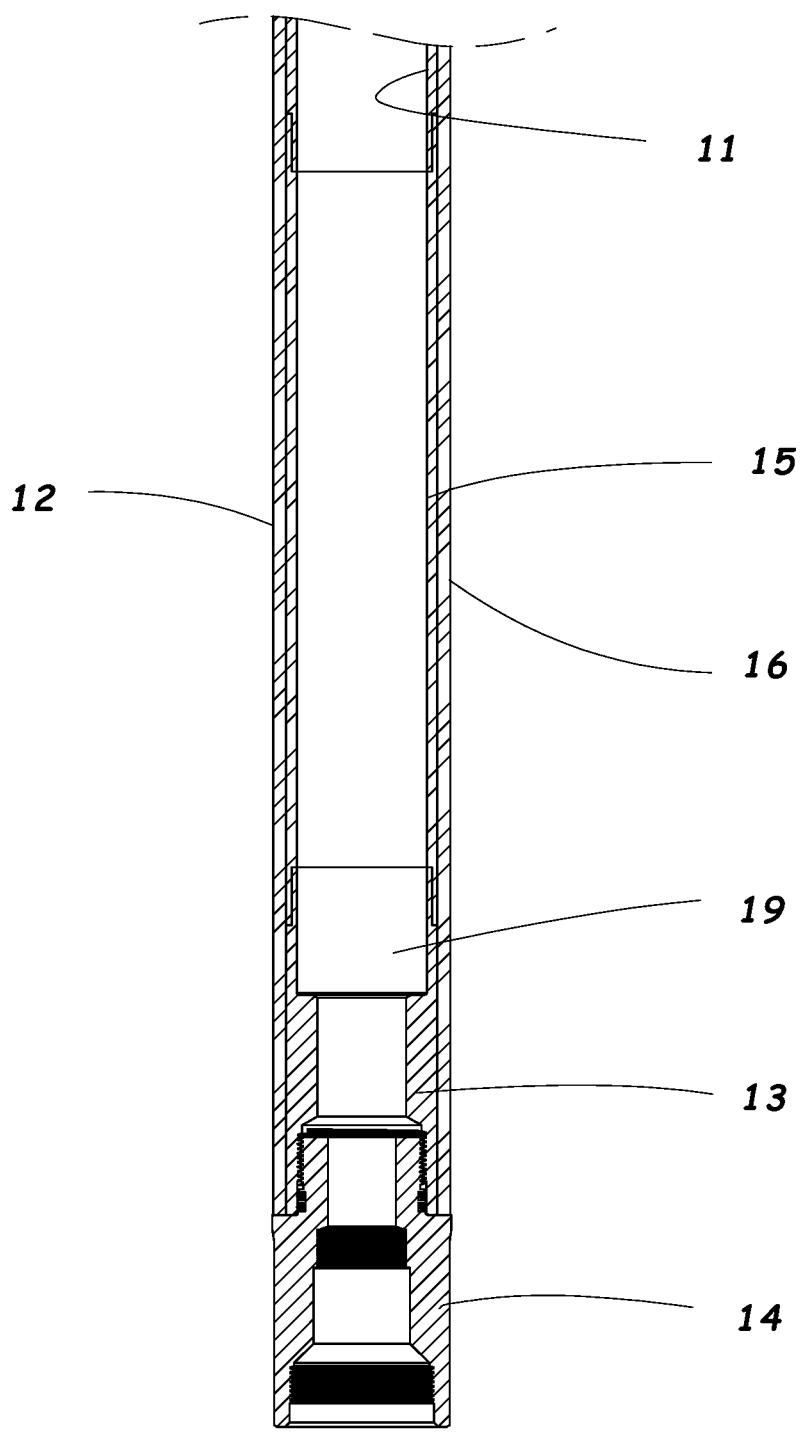
FIG. 11 is a further enlarged elevation view, in cross section, of the lower portion of the probe assembly shown in FIG. 8.
Figure 12:
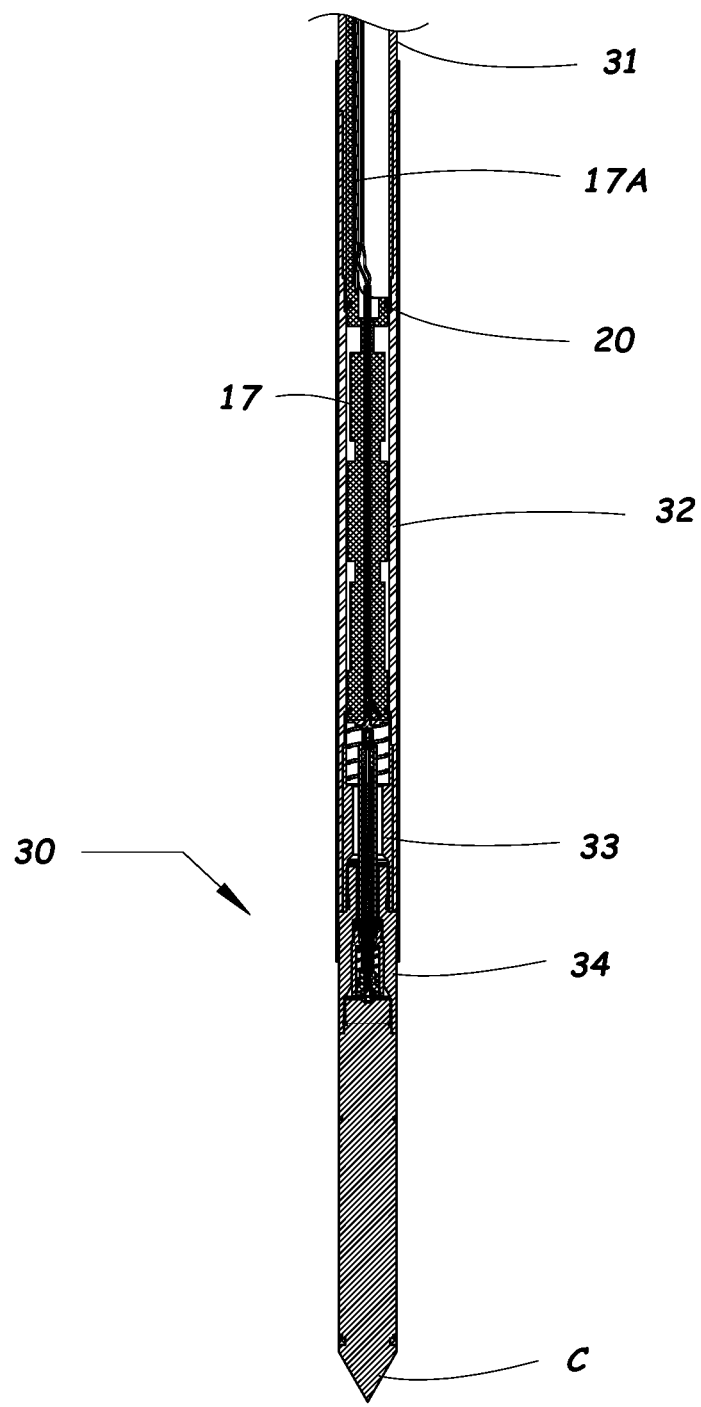
FIG. 12 is an elevation view, in cross section, of a direct push probe assembly according to another embodiment of the present invention, in which the probe assembly has a non-conductive, non-magnetic window section covered by a wear resistant sleeve.
Figure 13:
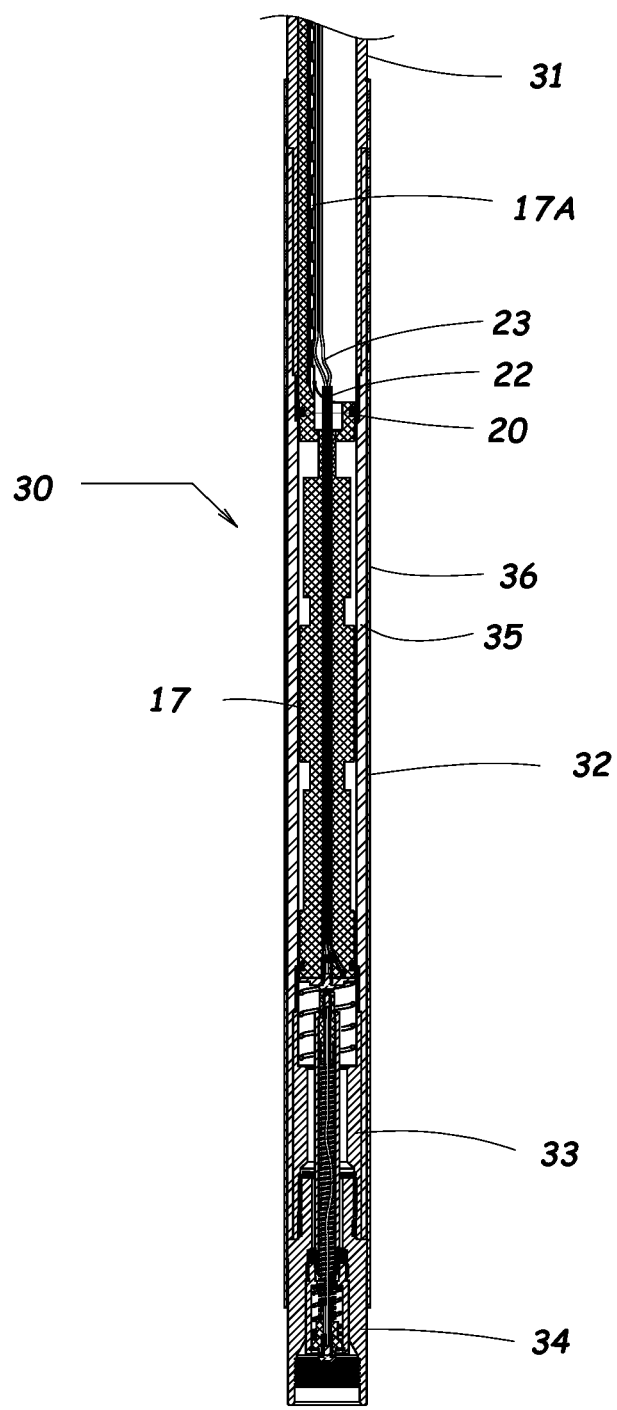
FIG. 13 is an enlarged elevation view, in cross section, of a lower portion of the direct push probe assembly shown in FIG. 12, with the CPT cone removed from the lower end of the probe assembly.
Figure 14:
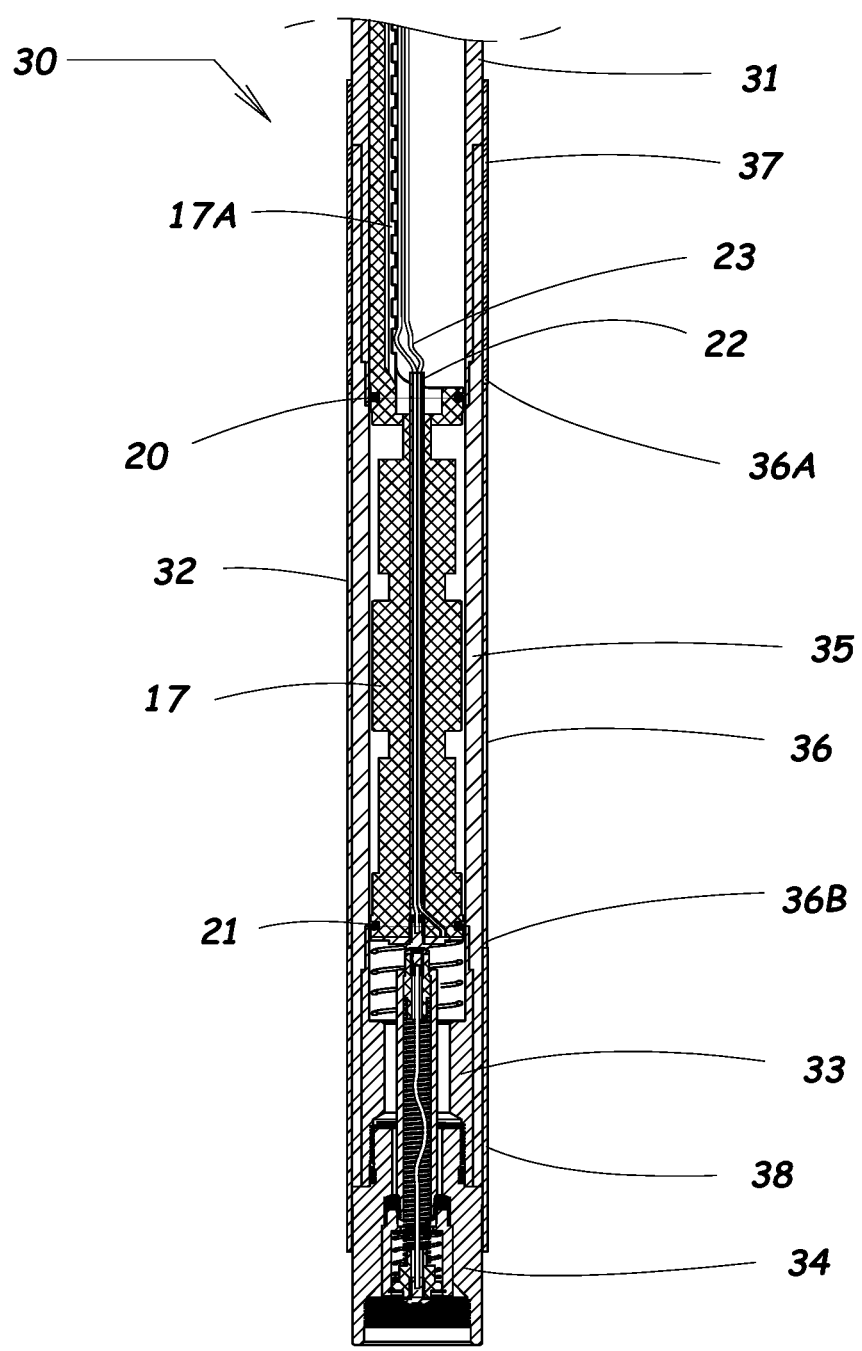
FIG. 14 is a further enlarged elevation view, in cross section, of a lower end portion of the direct push probe assembly shown in FIG. 13.
Figure 15:
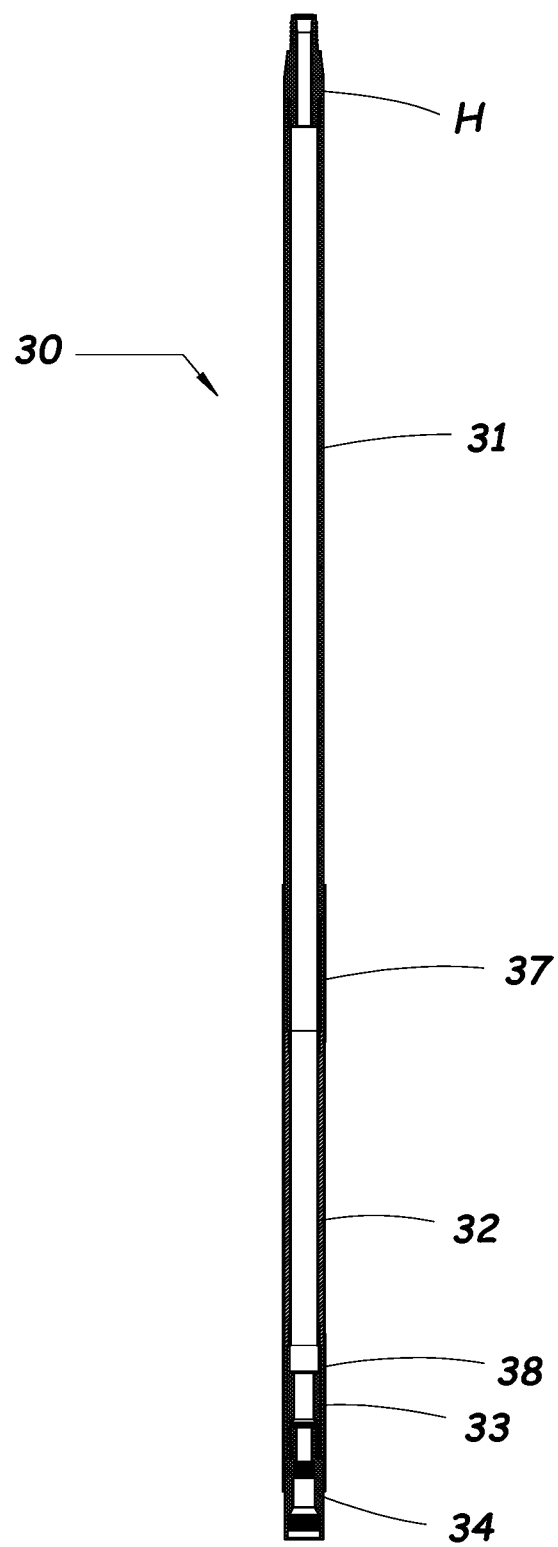
FIG. 15 is an elevation view, in cross section, of the direct push probe assembly shown in FIG. 12, with the NMR components and CPT cone removed.
Figure 16:
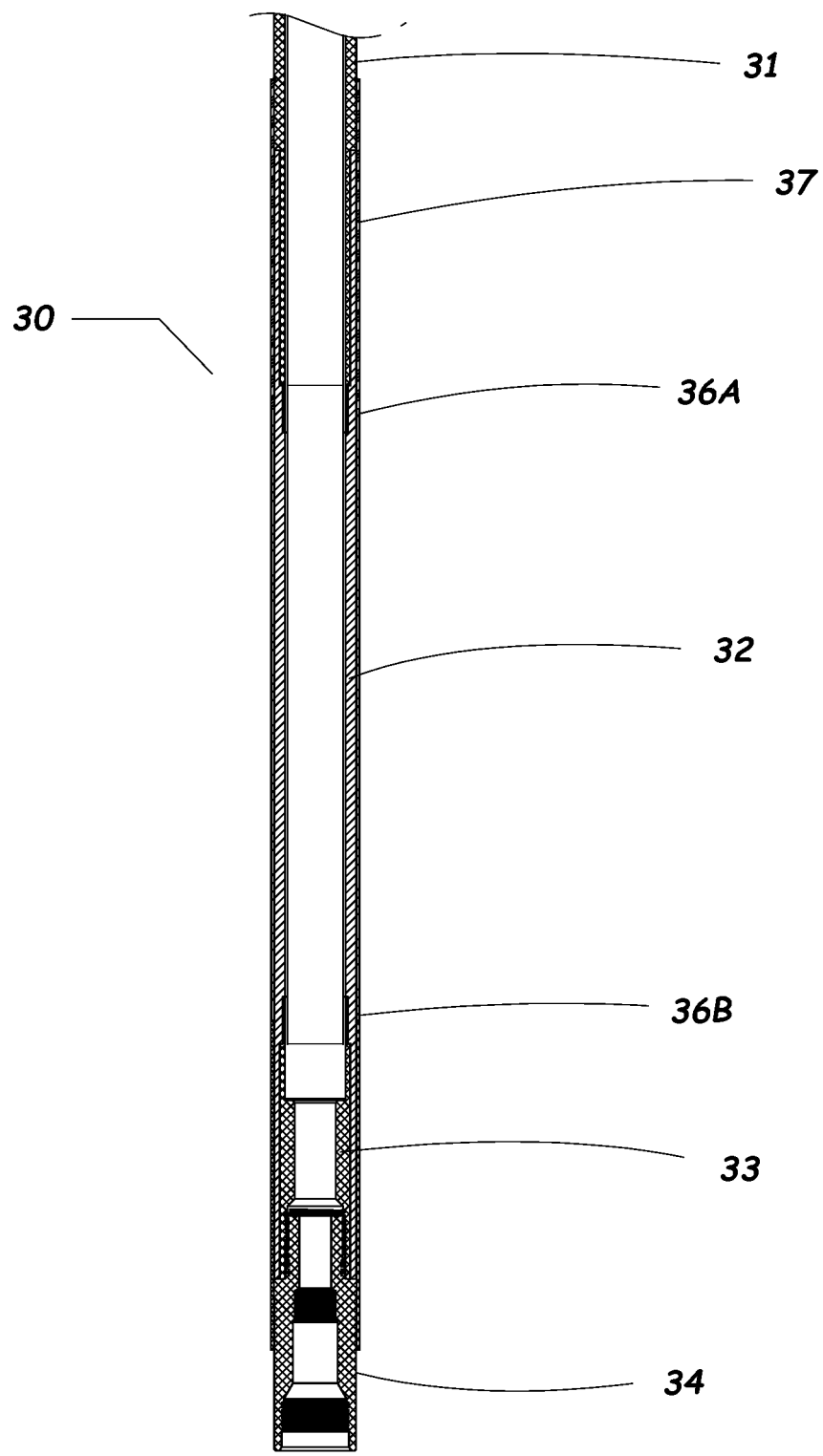
FIG. 16 is an enlarged elevation view, in cross section, of a lower portion of the direct push probe assembly shown in FIG. 15.
Figure 17:
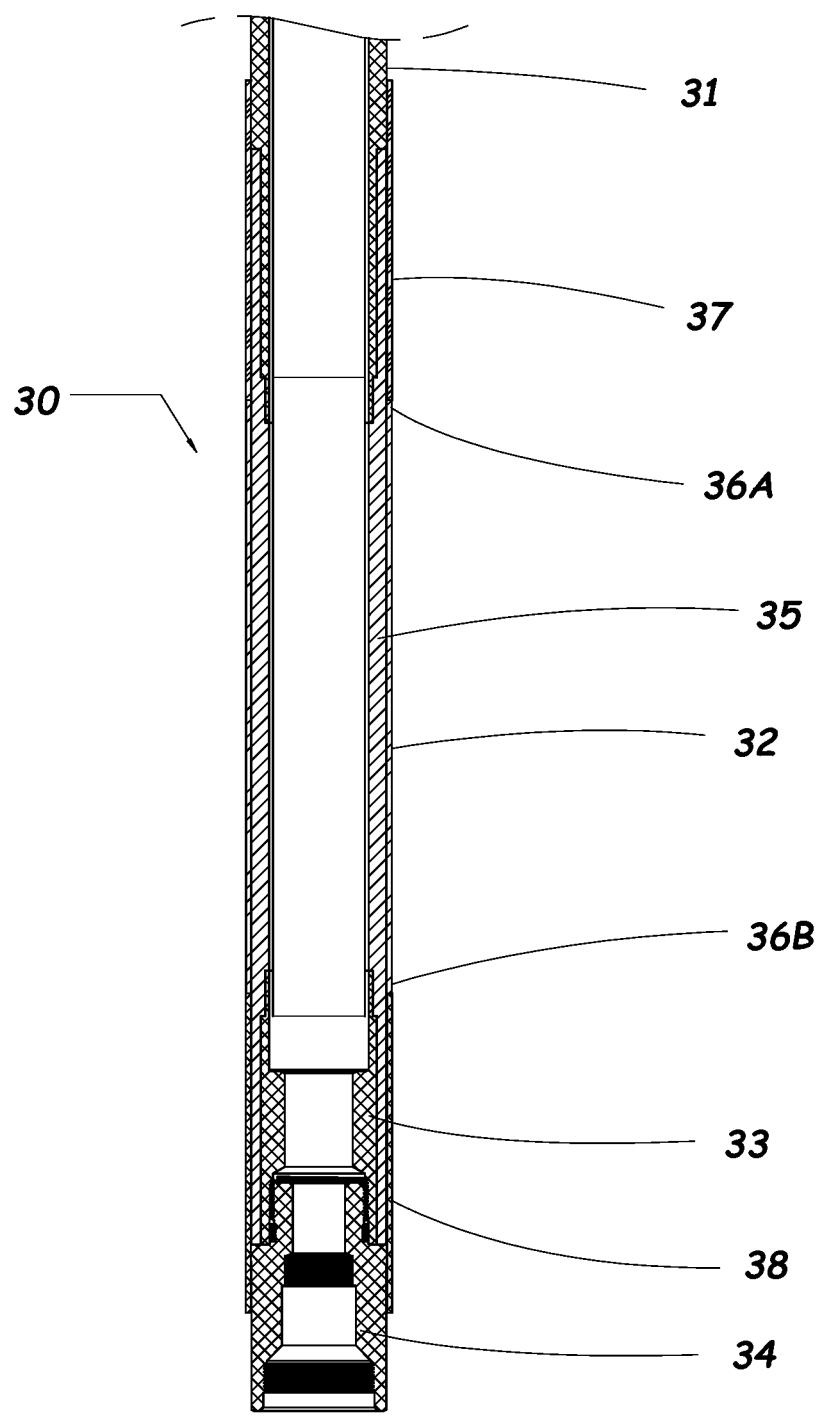
FIG. 17 is a further enlarged elevation view, in cross section, of the lower portion of the direct push probe assembly shown in FIG. 15.
Figure 18:
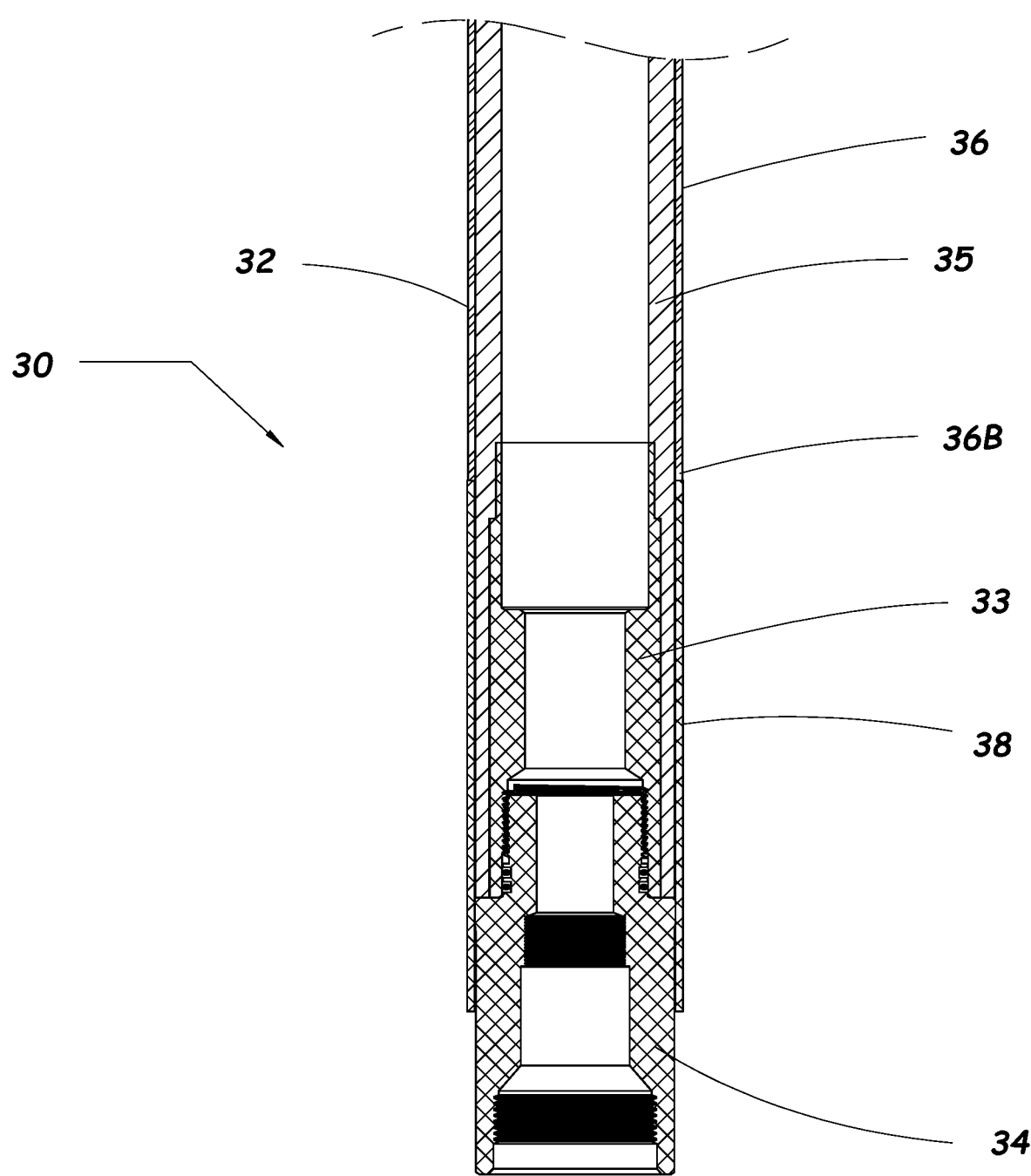
FIG. 18 is a still further enlarged elevation view, in cross section, of the lower portion of the direct push probe assembly shown in FIG. 15.

FIG. 3 illustrates an alternative embodiment in which a window section 12A of the direct push probe assembly 10 is a non-cylindrical, non-conductive section of the probe assembly 10. The non-cylindrical window section 12A can be, for example, a partial cylindrical section of the probe assembly 10 that is not circumferentially continuous. The non-cylindrical window section 12A allows electromagnetic (e.g., NMR) measurements to be collected in only a portion of the azimuthal directions around a sensor positioned in the center of the probe assembly 10. The sensor has a magnet and coil configuration that uses centered measurements through the window section 12A to create sensitive zone geometries that are sensitive in only a portion of the azimuthal directions around the center of the probe assembly 10 (i.e., a side-looking NMR).

The direct push probe assembly 10 includes a sheath or housing that can be pushed into soil using static force or a combination of static and dynamic forces. The electromagnetic components 17 loaded into this housing can be, for example, the NMR electronics used in the Javelin and Dart tools available from Vista Clara Inc. of Mukilteo, Washington.

The NMR electronics 17 contained in the direct push probe assembly of the present invention can be used in applications other than this push probe. For example, the same NMR electronics can be placed in a fiberglass housing and used for open borehole logging.

In one working example, the probe assembly 10 of the present invention has an inside diameter (bore) of 1.281 inches. This bore diameter accommodates the NMR electronics package from Vista Clara Inc. (Model JP140 J). The outside diameter of the probe assembly 10 is 1.75 inches, and the overall length of the probe assembly 10 is approximately 66.9 inches. Adding a CPT cone C. at the bottom will add another 11 inches to the overall assembly.

The direct push probe assembly 10 must be able to transmit the load applied to the head H at the top of the probe assembly 10 to the push point or CPT cone C at the bottom of the probe assembly 10. For example, an applied load of 15 tons may be sufficient for operation in some geologies, while an applied load of 20 tons may be needed for other applications. Therefore, the non-metallic, non-conductive, non-magnetic window section 12 of the probe assembly 10 needs to be able to transmit a large applied load as the tool 10 is advanced into the ground (e.g., an applied load of 20 tons).

The upper metal housing 11 can be a metal tube of uniform ID and OD. The top of the upper metal housing 11 is threaded to receive the top push head H. The push head H provides a transition from the NMR probe assembly 10 to the push rods (not shown) used to push the tool string into the ground.

The lower window section 12 is made of non-conductive, non-magnetic materials to allow electromagnetic measurements through the sidewall of the probe assembly 10. In one embodiment, the lower window section 12 comprises a fiberglass cylinder. In another embodiment, the lower window section comprises a combination of a fiberglass inside cylinder 15 and a ceramic (such as alumina) outside cylinder 16. The bore of the lower window section 12 matches the bore through the upper housing 11 and is of sufficient inside diameter to permit insertion of the NMR electronics package 17.

The inside cylinder 15 of the window section 12 can be made of fiberglass or another suitable non-conductive, non-magnetic material. The upper portion of the inside cylinder 15 bears on the upper housing 11, and the lower portion of the inside cylinder 15 bears on the lower end piece 13.

The outside cylinder 16 of the window section 12 can be made of fiberglass or ceramic or other suitable non-conductive, non-magnetic material. The outside cylinder 16 is longer than the inside cylinder 15 and overlaps reduced diameter sections of the upper housing 11 and the lower end piece 13. The length of overlap is relatively long to provide sufficient surface area to bond the outer cylinder 16 to the upper housing 11 and the lower end piece 13. A suitable adhesive, such as an epoxy adhesive, can be used to create a high strength bond and support between the outside cylinder 16 and the reduced diameter sections of the upper housing 11 and the lower end piece 13.

The high strength adhesive bond and support at the respective upper and lower ends of the window section 12 provide sufficient strength to withstand the loads transmitted from the top of the probe assembly 10 to the lower end piece 13 of the probe assembly 10 as the probe assembly 10 is pushed into the ground. For example, the length of overlap can be approximately 1.78 to >4 times the outer diameter of the probe assembly 10.

The NMR electronics 17 are placed and held in a centered position in the window section 12 of the probe assembly 10. The NMR electronics 17 may include electromagnetic components, such as magnets and coils 18, used in the Javelin and Dart tools available from Vista Clara Inc. of Mukilteo, Washington.

The lower end piece 13 is attached to the lower end of the window section 12. The lower end piece 13 provides a transition from the lower strength of the window section 12 to the higher strength metal below the window section 12. The lower end piece 13 may have a pocket 19 at its upper end to contain the lower end of the NMR electronics package 17.

If the window section 12 of non-conductive, non-magnetic material is of insufficient length (too short), then the magnetic field of the NMR may be adversely affected by the upper and lower metal parts 11, 13 of the probe assembly and adversely affect the NMR measurements.

In the working example described above, the outer cylinder 16 of the window section 12 of the probe assembly 10 is made of an alumina ceramic cylinder. The outer cylinder 16 overlaps the upper alloy steel cylinder 11 by approximately seven inches and the lower end piece 13 by approximately three inches. The inner cylinder 15 of the window section 12 is made of a fiberglass cylinder. The length of the non-magnetic, non-conductive window section 12 on this probe assembly 10 is approximately 14 inches. The probe assembly 10 in this working example has been designed and tested to confirm it will withstand 20 tons axial load in soil without failure.

The probe assembly 10 has an internal water seal 20 in a bore of the probe assembly 10 above the window section 12 to prevent ingress of water into a cavity of the probe assembly 10 above the window section 12 of the probe assembly 10 in the event the window section 12 breaks or fails and allows ingress of water into the probe assembly 10. For example, the seal 20 can be a rubber O-ring positioned in an upper groove of the NMR assembly 17 that creates a seal between the outer surface of the NMR assembly 17 and the inner bore of the upper housing 11 to protect the upper end 17A of the NMR electronics package 17 from water damage. A lower internal water seal 21 can be provided to create a seal in a bore of the probe assembly 10 below the window section 12. For example, the seal 21 can be a rubber O-ring positioned in a lower groove of the NMR assembly 17 that creates a seal between the outer surface of the NMR assembly 17 and the inner bore of the lower end piece 13.

The window section 12 has at least two conductive wires 23 passing through the bore of the window section 12 from top to bottom to permit data collection from a CPT cone C or other measurement device positioned at the lower end of the probe assembly 10. In one embodiment, the conductive wires pass through a tube 22, such as a metal tube, that extends along a length of the NMR package 17.

A probe assembly 30 according to a second embodiment of the present invention is illustrated in FIGS. 12 to 18. The probe assembly 30 includes an upper metal housing 31, a window section 32 made of non-conductive, non-magnetic materials, a lower end piece 33, and a cone adapter 34 for receiving a CPT cone C. The probe assembly 30 includes electromagnetic components 17 within an internal bore of the probe assembly 30 for measuring NMR, capacitance, and/or apparent resistivity. The electromagnetic components 17 can be the same as described above for the first embodiment of the invention.

The window section 32 in the probe assembly 30 includes a ceramic inside cylinder 35, and an outer sleeve 36. Both the ceramic inside cylinder 35 and the outer sleeve 36 are made of non-conductive, non-magnetic materials. The outer sleeve 36 provides structural strength (compressive, tensile, and stiffness) to the window section 32. For example, the outer sleeve 36 provides tensile strength to allow the probe assembly 30 to be pulled back out of the soil after being pushed into the soil. The ceramic inside cylinder 35 has a high compressive strength that allows the probe assembly 30 to be pushed into the soil, but a relatively low tensile strength. The outer sleeve 36 provides sufficient tensile strength to pull the probe assembly 30 back out of the soil.

The outer sleeve 36 can be a plastic composite tubing reinforced with a fiber or fiber mesh that is resistant to abrasion, such as KEVLAR™ tubing. The outer sleeve 36 is placed over the outer surface of the ceramic cylinder 35 and bonded to the ceramic cylinder 35 using a suitable adhesive. The adhesive can be, for example, an epoxy that creates a high strength bond and support between the ceramic cylinder 35 and the outer sleeve 36.

Alternatively, the outer sleeve 36 can be provided as an abrasion resistant coating on a plastic composite tubing, such as fiberglass reinforced plastic, that does not have an abrasion resistant fiber. The abrasion resistant coating can be composed of a two-part epoxy binder and a suitable aggregate of high hardness, such as alumina oxide or silica grit. The aggregate can be, for example, 0.01 to 0.05 inch in diameter. The binder and aggregate are mixed together and troweled and smoothed onto the outer surface of the plastic composite tubing and allowed to cure. Other methods of applying the abrasion resistant coating to the tubing can also be used, such as brushing or spraying the coating on the tubing. The cured layer of binder and aggregate forms the abrasion resistant coating on the outer sleeve 36 and will resist abrasion and erosion as the probe assembly 30 is moved through the soil.

Upper and lower metal sleeves 37, 38 are positioned over the outer surface of the ceramic cylinder 35 above and below the outer sleeve 36 to add structural strength to the window section 32. The upper and lower metal sleeves 37, 38 abut the respective upper and lower ends 36A, 36B of the outer sleeve 36. The upper metal sleeve 37 overlaps an upper end portion of the ceramic cylinder 35 and a lower end portion of the upper metal housing 31. The lower metal sleeve 38 overlaps a lower end portion of the ceramic cylinder 35 and an upper end portion of the lower end piece 33. The inner surfaces of the upper and lower metal sleeves 37, 38 are bonded to the upper metal housing 31, the ceramic cylinder 35, and the lower end piece 33 to strengthen the probe assembly 30. The upper and lower metal sleeves 37, 38 can also be welded to the upper metal housing 31 and lower end piece 33, respectively, to further strengthen the probe assembly 30.

Embodiments of a direct push probe assembly 10, 30 with a non-magnetic, non-conductive window section containing NMR components according to the present invention are described above. Various data acquisition electronics can be used with the probe assembly. For example, synchronous data acquisition electronics can be located at the ground surface and connected to the tool via analog transmission lines. Some specific embodiments of this include: (1) RF transmit energy can be generated at the surface via an RF amplifier and transmitted to the NMR tool via hardware transmission lines; (2) NMR receive signals can be transmitted to surface electronics via analog hardware transmission lines and sampled at the surface; (3) other power and control signals can be sent to/from the tool via hardware transmission lines; and (4) hardware transmission lines can be used together with the conductive parts of the housing and drill string as one of the conductors.

The direct push probe assembly 10, 30 according to the present invention can be deployed from the ground surface and pushed into the ground using a direct push drill rig, such as the 6712DT Drill Rig available commercially from Geoprobe Systems in Salina, Kansas.

Other methods of deploying the push probe assembly 10, 30 of the present invention can also be used. For example, the push probe assembly 10, 30 can be deployed from an above surface vessel or platform and used to measure NMR properties of the subsea floor, or sediments under freshwater bodies of water. The tool can also be deployed from a terrestrial, airborne or undersea vehicle. The deployment vehicle can be manually or remotely operated, or can be made to function autonomously.

While the invention has been described in connection with specific embodiments thereof, it is to be understood that this is by way of illustration and not of limitation, and the scope of the appended claims should be construed as broadly as the prior art will permit.

What is claimed is:

1. A direct push probe assembly, comprising:
   a window section constructed of non-conductive, non-magnetic materials for allowing electromagnetic measurements through the window section;
   wherein said electromagnetic measurements are NMR measurements, and further comprising an NMR sensor positioned within the probe assembly, said NMR sensor having a magnet and coil configuration capable of performing NMR measurements in earth formations through the window section.

2. The direct push probe assembly according to claim 1, wherein said probe assembly has a cylindrical outer surface.

3. A direct push probe assembly, comprising:
   a window section constructed of non-conductive, non-magnetic materials for allowing electromagnetic measurements through the window section;
   wherein said window section comprises a non-conductive, non-magnetic cylindrical section of the probe assembly; and
   further comprising an NMR sensor positioned within the probe assembly, said NMR sensor having a magnet and coil configuration that uses centered measurements through the window section to create sensitive zone geometries that are sensitive in all azimuthal directions around a center of the probe assembly.

4. A direct push probe assembly, comprising:
   a window section constructed of non-conductive, non-magnetic materials for allowing electromagnetic measurements through the window section;
   wherein said window section comprises at least one non-conductive, non-magnetic partial cylindrical section of the probe assembly that is not circumferentially continuous; and
   further comprising an NMR sensor positioned within the probe assembly, said NMR sensor having a magnet and coil configuration that uses centered measurements through the window section to create sensitive zone geometries that are sensitive in only a portion of the azimuthal directions around a center of the probe assembly.

5. A direct push probe assembly, comprising:
   a window section constructed of non-conductive, non-magnetic materials for allowing electromagnetic measurements through the window section;
   wherein the window section comprises an inner layer and an outer layer, and wherein both the inner layer and the outer layer are independently attached to an upper metal section of the probe assembly above the window section and a lower metal section of the probe assembly below the window section;
   wherein the inner layer and the outer layer of the window section are both arranged to transfer compressive and tensile forces from the upper metal section to the lower metal section;
   wherein the outer layer of the window section is constructed of a hard material of relatively high elastic modulus; and
   wherein the inner layer of the window section is constructed of a material having a lower elastic modulus than the outer layer.

6. The direct push probe assembly according to claim 5, wherein said window section is made of materials capable of withstanding forces required to advance the probe assembly into the earth.

7. The direct push probe assembly according to claim 5, further comprising an upper metal housing, a lower metal end piece, and said window section positioned between said upper metal housing and said lower metal end piece, said window section being able to withstand forces required to advance the probe assembly into the earth.

8. The direct push probe assembly according to claim 7, wherein said lower metal end piece has a lower threaded end for attachment of either an instrumented CPT cone or a push point.

9. The direct push probe assembly according to claim 5, wherein said hard material is a ceramic material.

10. The direct push probe assembly according to claim 9, wherein said ceramic material is selected from the group consisting of alumina ceramic and zirconia ceramic.

11. The direct push probe assembly according to claim 5, wherein said inner layer is constructed of fiberglass or another composite plastic.

12. The direct push probe assembly according to claim 5, wherein said outer layer has a compressive strength and elastic modulus that is at least five times higher than the inner layer.

13. The direct push probe assembly according to claim 12, wherein said outer layer has a compressive strength and elastic modulus that is approximately ten times higher than the inner layer.

14. The direct push probe assembly according to claim 5, wherein both the inner layer and the outer layer are attached to the upper metal section of the probe assembly above the window section and the lower metal section of the probe assembly below the window section using adhesives.

15. The direct push probe assembly according to claim 5, wherein a lower end of the probe assembly below the window section is equipped with a CPT cone for measurement of geotechnical engineering properties and stratigraphy of the soil as the probe assembly is advanced into the earth.

16. The direct push probe assembly according to claim 5, wherein the window section has at least two conductive wires passing through an internal bore of the window section from top to bottom to permit data collection from a CPT cone or other measurement device positioned at a lower end of the probe assembly.

17. The direct push probe assembly according to claim 5, wherein the probe assembly is equipped with a first internal water seal in a bore of the probe assembly above the window section to prevent ingress of water into a cavity of the probe assembly above the window section of the probe assembly in the event that the window section breaks or fails and thus allows ingress of water into the probe assembly.

18. A direct push probe assembly, comprising:
a window section constructed of non-conductive, non-magnetic materials for allowing electromagnetic measurements through the window section;
wherein the window section comprises an inner ceramic cylinder and an outer sleeve, said outer sleeve comprising a plastic composite tubing that covers at least a portion of an outer surface of the ceramic cylinder.

19. The direct push probe assembly according to claim 18, wherein said plastic composite tubing of said outer sleeve is reinforced with a fiber or fiber mesh that is resistant to abrasion.

20. The direct push probe assembly according to claim 18, wherein an outer surface of said plastic composite tubing is coated with an abrasion resistant coating to resist abrasion and erosion as the probe assembly is moved through soil.

21. The direct push probe assembly according to claim 18, further comprising upper and lower metal sleeves positioned over upper and lower end portions of the ceramic cylinder above and below the outer sleeve, respectively, and said upper and lower metal sleeves are arranged to abut respective upper and lower ends of the outer sleeve and add structural strength to the window section.

22. The direct push probe assembly according to claim 21, wherein said outer sleeve and said upper and lower metal sleeves are bonded to an outer surface of the ceramic cylinder, said upper metal sleeve overlaps and is fixed to an upper metal section of the probe assembly above the window section, and said lower metal sleeve overlaps and is fixed to a lower metal section of the probe assembly below the window section.

23. A direct push probe assembly, comprising:
a window section constructed of non-conductive, non-magnetic materials for allowing electromagnetic measurements through the window section;
wherein the probe assembly is equipped with a first internal water seal in a bore of the probe assembly above the window section to prevent ingress of water into a cavity of the probe assembly above the window section of the probe assembly in the event that the window section breaks or fails and thus allows ingress of water into the probe assembly; and
wherein the probe assembly is equipped with a second internal water seal in a bore of the probe assembly below the window section to prevent ingress of water into a cavity of the probe assembly below the window section of the probe assembly in the event that the window section breaks or fails and thus allows ingress of water into the probe assembly.

24. A direct push probe assembly, comprising:
a window section constructed of non-conductive, non-magnetic materials for allowing electromagnetic measurements through the window section;
wherein the window section comprises a ceramic cylinder that overlaps an upper metal section of the probe assembly above the window section a first overlap distance and overlaps a lower metal section of the probe assembly below the window section a second overlap distance, and wherein the first and second overlap distances are at least 2 times the diameter of the probe assembly.

25. A method of collecting in situ soil measurements, comprising:
providing a direct push probe assembly having an upper metal housing, a lower metal end piece, and a non-conductive, non-magnetic window section positioned between the upper metal housing and the lower metal end piece;
pushing the probe assembly into soil; and
performing electromagnetic measurements through the window section as the probe assembly is being pushed into the soil or retracted from the soil;
wherein said electromagnetic measurements are NMR measurements.

26. The method according to claim 25, wherein said electromagnetic measurements are selected from the group consisting of capacitance measurements and apparent resistivity measurements.

27. A method for collecting NMR measurements with depth in soil, comprising:
providing a direct push probe assembly containing an NMR measurement apparatus;
pushing the probe assembly into the soil using static, vibratory, or percussive forces; and
taking NMR measurements either as the probe assembly is pushed deeper into the soil or as the probe assembly is retracted from depth in the soil or both.

28. The method according to claim 27, wherein said method is performed without drilling, casing, or otherwise creating a borehole in the ground as the probe assembly containing the NMR measurement apparatus is directly advanced into the soil.

* * * * *